(No Model.) 2 Sheets—Sheet 1.
G. W. BAILEY.
PUZZLE.
No. 487,063. Patented Nov. 29, 1892.
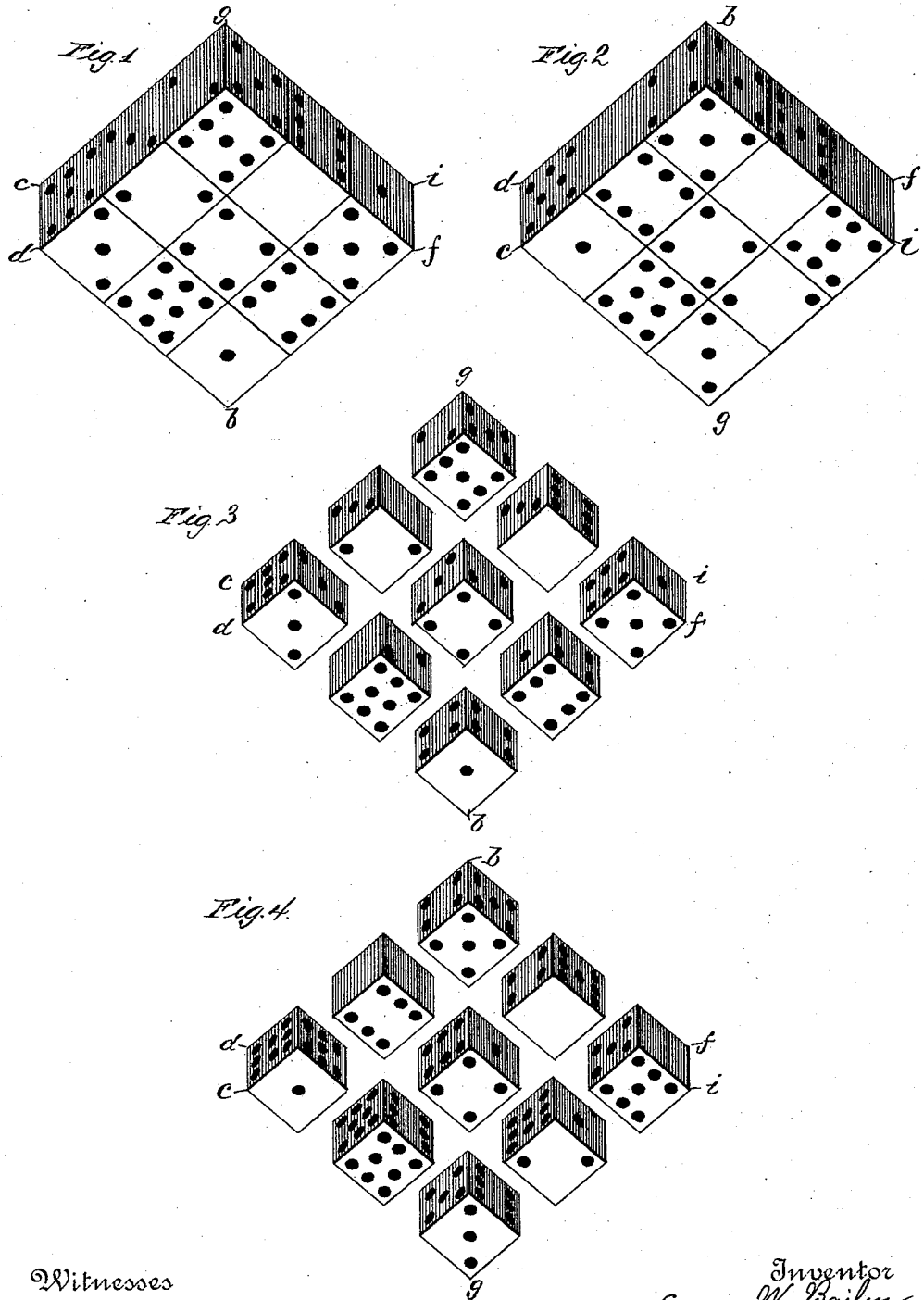
Witnesses
Fred S. Kemper
J. E. Greer
Inventor
George W. Bailey
By his Attorneys
Gifford & Saw.

(No Model.) 2 Sheets—Sheet 2.
G. W. BAILEY.
PUZZLE.
No. 487,063. Patented Nov. 29, 1892.
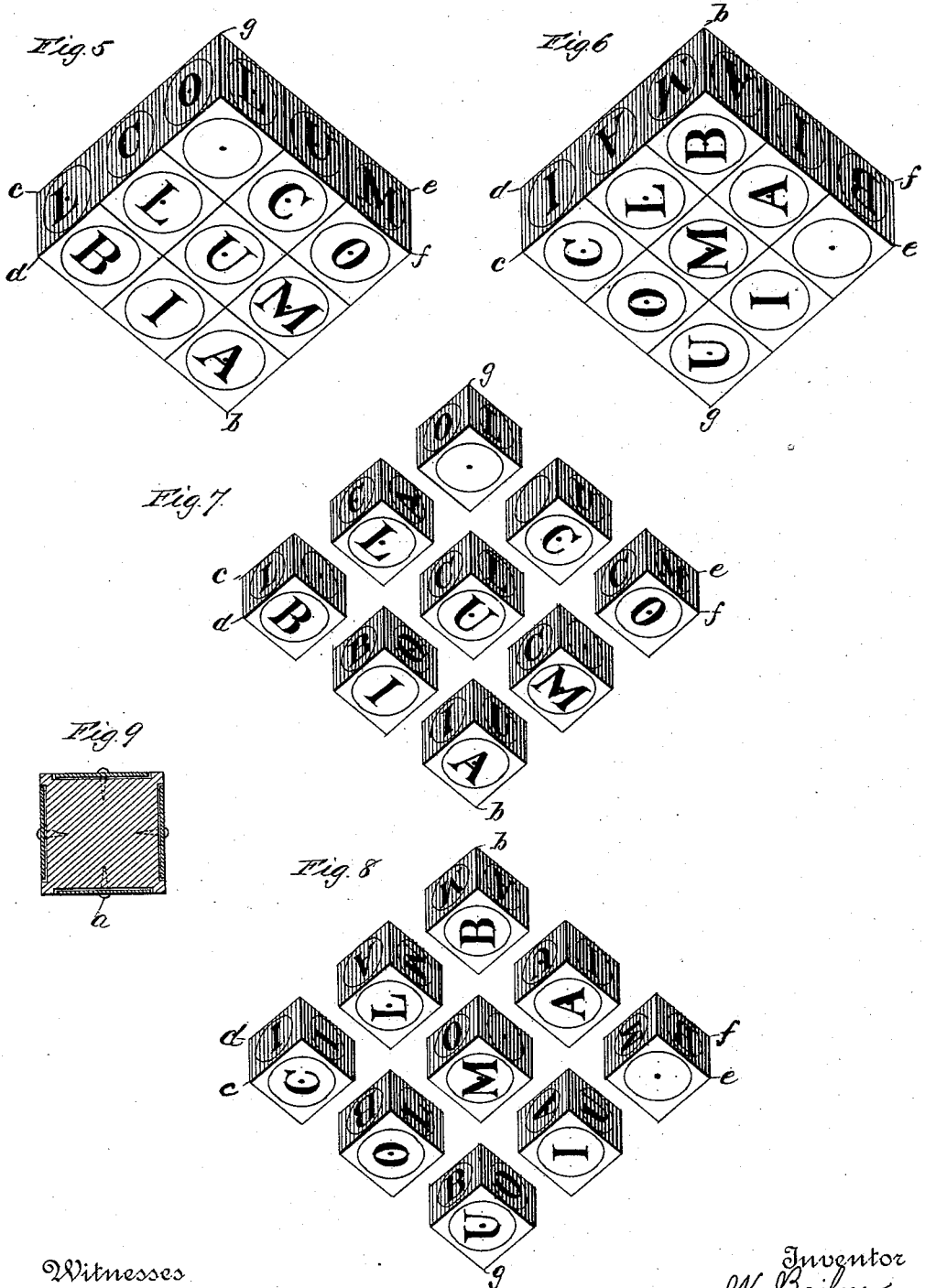
Witnesses
Fred Kemper
J. E. Greer
Inventor
George W. Bailey
By his Attorneys
Gifford Law

UNITED STATES PATENT OFFICE.

GEORGE W. BAILEY, OF BROOKLYN, NEW YORK.

PUZZLE.

SPECIFICATION forming part of Letters Patent No. 487,063, dated November 29, 1892.

Application filed April 29, 1892. Serial No. 431,101. (No model.)

*To all whom it may concern:*

Be it known that I, GEORGE W. BAILEY, of Brooklyn, Kings county, and State of New York, have invented a new Puzzle, of which the following is a specification.

In practicing my invention I employ a number of blocks, preferably cubes, each of which contains certain characters on its faces. The puzzle consists in arranging these blocks so as to produce a result—such as a sum in arithmetic, a word in orthography, or a picture made up of the characters on the blocks properly combined.

In the drawings I have shown two puzzles constructed according to my invention—one in arithmetic and the other in orthography.

Figures 1 and 2 are respectively a top and bottom view of a series of blocks so placed together as to solve an arithmetical puzzle. Figs. 5 and 6 are corresponding views of an orthographical puzzle on the same principle.

By considering Figs. 1 and 2 together, the same corners being lettered the same in both figures, the characters on all exposed faces of the blocks can be determined. The same is true of Figs. 5 and 6. In order to show those on the inside faces or those in contact with the adjacent blocks, Figs. 3 and 4 are added, corresponding, respectively, with Figs. 1 and 2, excepting with the blocks sufficiently separated to display the characters between; and Figs. 7 and 8 are added to perform the same function with respect to the modification shown in Figs. 5 and 6. Fig. 9 shows how the letters may be attached.

Referring now to Figs. 1, 2, 3, and 4, it will be observed that in whichever way you add the three characters in line with each other, whether diagonally or directly crosswise, and whether on the top or edges or bottom, the sum will always be "12." It will be observed, also, by reference to Figs. 3 and 4 that the unexposed faces of the blocks where the blocks are in contact with each other contain characters that are duplicates of certain of the characters that are exposed when the blocks are in correct position. These duplicate characters enhance the difficulty of solving the puzzle to a large extent, although the duplicate characters among those exposed to view among themselves constitute an element of difficulty.

The characters in the form of the puzzle, as illustrated in Figs. 1, 2, 3, and 4 consist in a series of dots to indicate in each case a separate number, as in the case of dice.

In the modification shown in Figs. 5, 6, 7, and 8 letters are substituted as characters, and here the solution of the puzzle requires that the letters should be arranged to spell a given name in regular order—in the example given, " Columbia " on both the top and bottom faces and " Columbia Mail " around the edge. In this modification, as in the first, the faces of the blocks that come in contact with each other and are therefore not exposed are provided with letters that are duplicates of letters appearing on the exposed surfaces of the blocks.

In the case where letters are used the position that each letter occupies upon the block might serve as an aid to the solution of the puzzle, to avoid which I so attach each letter to the block (as by a central pin $a$, Fig. 9) that the letter may be rotated on the face of the block. Thus they may all be rotated out of their correct positions when the blocks are given to a person to solve the puzzle.

It will be observed that in the construction of the blocks for this puzzle, the interior faces—that is, those faces that are in contact with each other, and therefore out of sight when the blocks are in correct position—being duplicates of certain of the exterior faces, the solver of the puzzle not only does not know which of the exterior faces are to occupy certain positions, but he does not know whether a given face is in the final arrangement to be an interior face or an exterior face. It will also be observed that in many instances blocks contain duplicate characters on two or more faces; also, that where the characters are duplicates the faces bearing the duplicate characters are duplicates in other respects, so as to be indistinguishable from each other.

I am not aware of any puzzle having heretofore been constructed in which the interior faces were indistinguishable from the exterior faces or in which certain of the exterior faces were indistinguishable from each other.

Although in the first form of puzzle exemplified the number "12" is the solution, it is obvious that the numbers on the blocks may be different to give some different product as the solution; also, in the second form exemplified it is obvious that instead of the word "Columbia" another word or series of words may be adopted. Again, in lieu of either figures or letters the characters on the exposed faces of the blocks may form parts of a picture or pictures, which parts are duplicated either among the exposed faces or on the inside faces.

It should be observed that when the blocks are properly arranged there is a solution on the top face of the combined blocks, a solution on the bottom face, and a solution on the edge faces; but although my invention involves the showing of the solution on more than one of these faces I do not wish to be limited to having it appear on all of them or to having the solution appearing on the one face as a duplicate of the solution appearing on another.

I have taken pains to enhance the confusion by repeating each face many times on different blocks and by repeating each combination of faces (formed by two opposed faces on one block) on opposed faces of different blocks and by duplicating a face on the same block. The solver has no means of knowing in regard to a face or combination of opposed faces whether it is to form part of the solution or to face inward out of sight or which way it is to be turned.

I claim—

1. A puzzle comprising a series of blocks containing characters, so that when the faces of the blocks are correctly arranged the characters will combine to exhibit the solution on a plurality of the exterior faces of the combined blocks, certain of the interior faces of said blocks being indistinguishable from certain exterior faces, substantially as described.

2. A puzzle comprising a series of blocks containing characters, so that when the faces of the blocks are correctly arranged the characters will combine to exhibit the solution on a plurality of the faces of the combined blocks, certain faces of said blocks being duplicates of others, substantially as described.

3. A puzzle comprising a series of blocks having characters revolubly secured to their faces, substantially as described.

GEORGE W. BAILEY.

Witnesses:
J. E. GREER,
FRED. S. KEMPER.